June 16, 1931. J. S. OURSLER 1,810,144
SAWING APPARATUS
Filed April 27, 1928
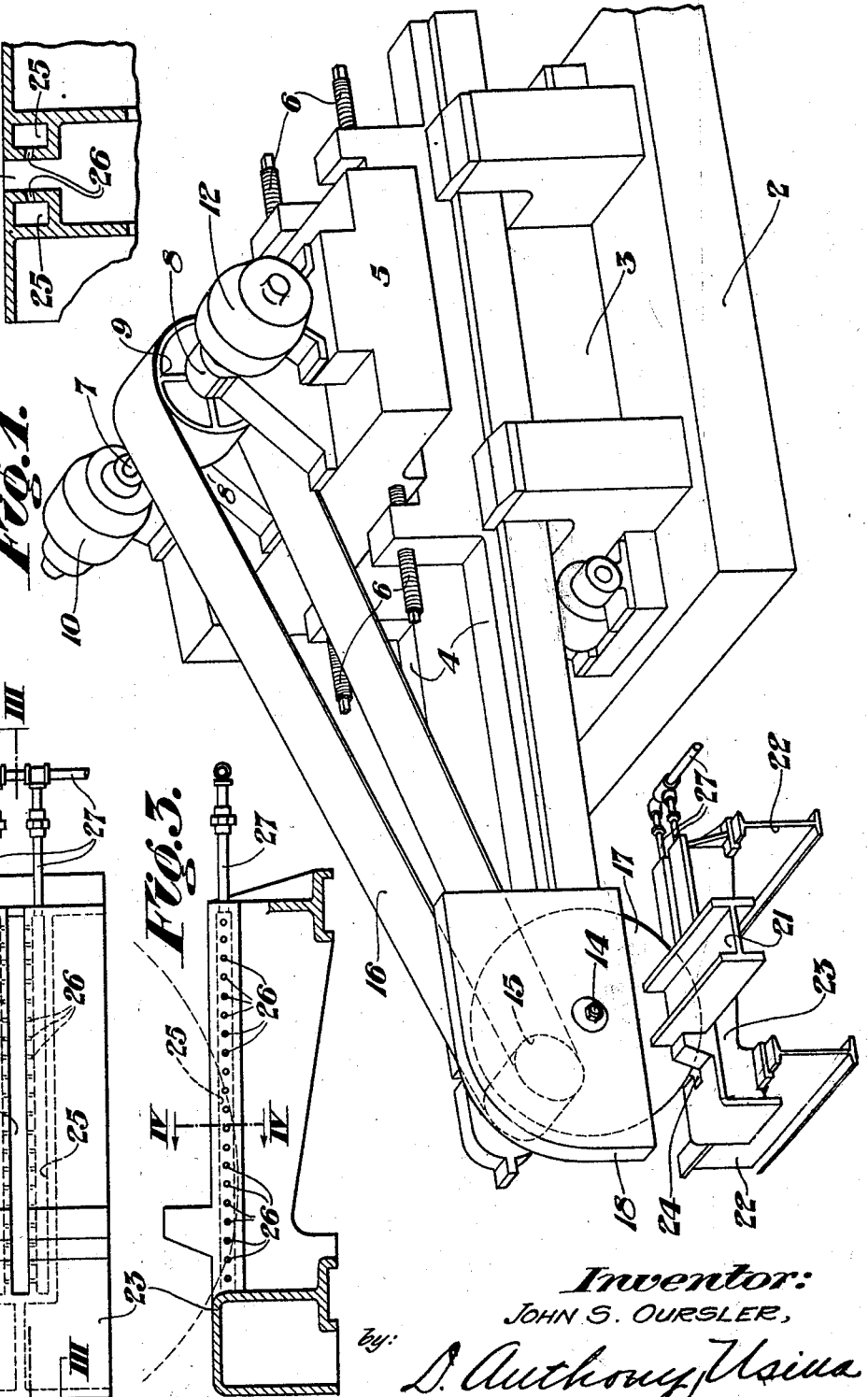
Inventor:
JOHN S. OURSLER,
by: D. Anthony Usina
his Attorney.

Patented June 16, 1931

1,810,144

UNITED STATES PATENT OFFICE

JOHN S. OURSLER, OF MUNHALL, PENNSYLVANIA

SAWING APPARATUS

Application filed April 27, 1928. Serial No. 273,272.

This invention relates to saws, and more particularly to power saws for cutting rolled metal shapes such as beams, columns and the like, and has for its object the provision of a novel structure whereby cooling fluid is directed against the saw after it has passed through the article being cut.

Another object is to provide a novel support for the shapes being cut having a slot through which the saw blade moves when cutting the shape, and having means for directing cooling fluid against the opposite sides of the saw blade so as to cool the saw blade and flush the cutting out of the slot.

In the drawings—

Figure 1 is a perspective view of a sawing apparatus embodying this invention.

Figure 2 is a plan of the work support.

Figure 3 is a sectional elevation taken on the line III—III of Figure 2.

Figure 4 is a sectional elevation taken on the line IV—IV of Figure 3.

Referring more particularly to the drawings, the numeral 2 designates the base or foundation for the saw on which a rigid bed 3 is mounted. A saw carriage 4 is mounted for reciprocatory movement on the bed 3. A sub-carriage 5 is mounted on the carriage 4 and is adapted to be adjusted relative thereto by screws 6.

A drive-shaft 7 is journaled in bearings 8 on the sub-carriage 5 and carries a drive-pulley 9. Motors 10 and 12 are mounted on the sub-carriage 5 at the opposite ends of the drive-shaft 7 and are connected to said drive-shaft so as to provide a balanced drive for said shaft.

A saw shaft 14 is journaled at the forward end of the carriage 4 and carries a pulley 15 which is connected to the drive-pulley 9 by a belt 16. The belt 16 is adapted to be tensioned by adjusting the sub-carriage 5 relative to the carriage 4.

A saw blade 17 is mounted on the shaft 14 and has its upper portion enclosed by a guard 18.

A structure for supporting the shape 21, or other article to be cut, is provided below and in line with the line of travel of the saw carriage. The supporting structure is composed of spaced side beams 22, which are bridged by a work-supporting member 23 having a clearance slot 24 therein for the saw blade 17 as it is moved through the work. The work-supporting member 23 is provided with a pair of conduits 25, one of which is arranged along each of the sides of the slot 24 adjacent the upper edge thereof. The conduits 25 are provided with a series of apertures 26 and are connected to a fluid supply pipe 27 so as to provide for directing cooling fluid against the opposite sides of the saw blade after it has passed through the work.

The pipe 27 preferably furnishes water to the conduits 25, although other fluid may be used, and the fluid besides cooling the saw blade 17 is adapted to remove the small particles of metal, cut from the work by the saw, from collecting and building up in the slot 24. When water is supplied to the conduits 25, it will be delivered through the apertures 26 against the saw and will flush out the slot 24.

The saw blade 17 is adapted to be rotated in a counterclockwise direction and to enter the slot 24 after it has passed through the work-piece. Therefore, the cooling fluid will strike the saw blade immediately after it has passed through the work-piece, and the saw blade will throw off said fluid, if it be liquid, before that portion of the saw blade again engages the work-piece.

While I have shown and described one specific embodiment of my invention, it will be understood that I do not wish to be limited thereto since various modifications may be made without departing from the scope thereof as defined in the appended claim.

I claim—

In a rotary saw for sawing rolled metal shapes the combination of a saw supporting structure having a rotary saw blade mounted thereon and a support for the shape to be cut, said support being provided with a slot in which the saw blade travels when cutting the shape, conduits formed in said support on both sides of and in horizontal alinement with said slot, openings forming passages extending transversely from said conduits through the walls of said slot, and water supply pipes connected to said conduits, said conduits and openings being adapted to direct water against both sides of the saw blade below the work-piece immediately after the blade has passed through the work-piece.

In testimony whereof, I have hereunto set my hand.

JOHN S. OURSLER.